United States Patent [19]

Motosugi

[11] Patent Number: 5,548,405
[45] Date of Patent: Aug. 20, 1996

[54] OPTICAL THREE-DIMENSIONAL SHAPE MEASURING APPARATUS HAVING A DEVICE FOR ACCURATELY POSITIONING AND MEASURING AN OBJECT

[75] Inventor: Kazutoshi Motosugi, Tama, Japan

[73] Assignees: Nikon Corporation, Tokyo; Nikon Engineering Co., Ltd., Yokohama, both of Japan

[21] Appl. No.: 360,040

[22] Filed: Dec. 20, 1994

[30]     Foreign Application Priority Data

Dec. 22, 1993 [JP] Japan .................................. 5-323471

[51] Int. Cl.$^6$ .................................................. G01B 11/24
[52] U.S. Cl. ...................... 356/376; 356/380; 250/559.21
[58] Field of Search ...................... 356/376, 375, 356/377, 384, 385; 250/561, 560, 563, 559.21, 559.22, 559.24

[56]     References Cited

U.S. PATENT DOCUMENTS 5,369,490  11/1994  Kawai et al. ............................ 356/376

Primary Examiner—Richard A. Rosenberger
Assistant Examiner—Robert Kim

[57]     ABSTRACT

An apparatus for measuring a three-dimensional shape of an object to be measured provided with a fitting portion, comprises: a body base; a rotation stage set on the base; an XY stage set on the rotation stage and provided with a fitting portion, the XY stage being movable in a predetermined horizontal direction and in a horizontal direction perpendicular thereto independently of rotation of the rotation stage; a drive control device for independently driving and controlling the rotation stage and XY stage; a holding device for holding the object to be measured, the holding device being provided with a fit portion to fit with the fitting portion of the XY stage, and a fit portion to fit with the fitting portion of the object to be measured; an R stage set above the holding device, the R stage being movable in a horizontal direction and in a direction of the diameter of the rotation stage; a first optical displacement gage provided on a lower surface of the R stage so that an optical axis thereof becomes parallel to a rotational axis of the rotation stage; a Z stage provided beside the holding device, the Z stage being movable in a direction parallel to the rotational axis; and a second optical displacement gage provided on a side surface of the Z stage so that an optical axis thereof becomes perpendicular to the rotational axis of the rotation stage.

5 Claims, 2 Drawing Sheets

OPTICAL THREE-DIMENSIONAL SHAPE MEASURING APPARATUS HAVING A DEVICE FOR ACCURATELY POSITIONING AND MEASURING AN OBJECT

BACKGROUND OF THE INVENTION

1. Field of the Invention

The present invention relates to a three-dimensional shape measuring apparatus for measuring a three-dimensional shape.

2. Related Background Art

Three-dimensional shape measuring apparatus (hereinafter, sometimes referred to as three-dimensional measuring apparatus) provided with a contact type probe are most frequently used for measuring a three-dimensional shape. Such apparatus, however, need to keep the contact type probe contact an object to be measured under a certain force, and, therefore, they are not suitable for measurement of a soft object to be measured such as rubber.

Then three-dimensional measuring apparatus provided with an optical probe are used for such a case, whereby measurement can be done keeping the probe not contact the object to be measured. Further, there are three-dimensional measuring apparatus using a CCD camera to take images of the object to be measured at a plurality of angles and thereby measuring the shape by image processing.

The three-dimensional measuring apparatus provided with the contact type probe, however, had another problem, in addition to the above problem, that if the object to be measured had a smaller recess than the size of the distal end of probe, the probe was unable to be set in the recess, which disabled the measurement.

Even in the case of measurement with the three-dimensional measuring apparatus provided with the optical probe, the object to be measured needs to have a space through which a beam emitted from the probe and reflected light thereof can pass. Thus, the three-dimensional measuring apparatus provided with the optical probe had a problem that they were not able to measure well an object to be measured having a shape of narrow and deep channel.

The three-dimensional measuring apparatus measuring the shape by image processing had a problem that shadow portions were unable to be measured even if the object to be measured was photographed in a plurality of directions by the CCD camera.

SUMMARY OF THE INVENTION

The present invention has been accomplished taking the above problems in the conventional technology into account, and an object of the invention is to provide a three-dimensional shape measuring apparatus which can measure even an object to be measured having a portion which the conventional apparatus were unable to measure, such as the shadow portions, the portion of narrow and deep channel, etc.

To achieve the above object, a first aspect of the present invention involves an apparatus for measuring a three-dimensional shape of an object to be measured provided with a fitting portion, comprising: a body base; a rotation stage set on said base; an XY stage set on said rotation stage and provided with a fitting portion, said XY stage being movable in a predetermined horizontal direction and in a horizontal direction perpendicular thereto independently of rotation of said rotation stage; drive control means for independently driving and controlling said rotation stage and XY stage; holding means for holding said object to be measured, said holding means being provided with a fit portion to fit with said fitting portion of said XY stage, and a fit portion to fit with said fitting portion of said object to be measured; an R stage set above said holding means, said R stage being movable in a horizontal direction and in a direction of the diameter of said rotation stage; a first optical displacement gage provided on a lower surface of said R stage so that an optical axis thereof becomes parallel to a rotational axis of said rotation stage; a Z stage provided beside said holding means, said Z stage being movable in a direction parallel to said rotational axis; and a second optical displacement gage provided on a side surface of said Z stage so that an optical axis thereof becomes perpendicular to the rotational axis of said rotation stage.

It is preferred that the optical displacement gages be laser displacement gages.

Also, a second aspect of the present invention involves an apparatus for measuring a three-dimensional shape of an object to be measured provided with a plurality of recesses on a surface thereof, comprising: a body base; a rotation stage set on said base; an XY stage set on said rotation stage, said XY stage being movable in a predetermined horizontal direction and a horizontal direction perpendicular thereto independently of rotation of said rotation stage, said XY stage being provided with a positioning pin on an upper surface thereof; drive control means for independently driving and controlling said rotation stage and XY stage; holding means for holding said object to be measured, said holding means comprising a cast base plate detachably mounted on said XY stage in a fitting state with said positioning pin, a cast base set on said cast base plate, and a gypsum block set on said cast base and provided with a plurality of projections to fit with said recesses of said object to be measured; an R stage set above said holding means, said R stage being movable in a horizontal direction and in a direction of the diameter of said rotation stage; a first laser displacement gage provided on a lower surface of said R stage so that an optical axis thereof becomes parallel to a rotational axis of said rotation stage; a Z stage provided beside said holding means, said Z stage being movable in a direction parallel to said rotational axis; and a second laser displacement gage provided on a side surface of said Z stage so that an optical axis thereof becomes perpendicular to the rotational axis of said rotation stage.

In the present invention, the object to be measured is cut into fragments so that the laser light from the laser displacement gages can reach the portion of the object to be measured which the conventional apparatus or methods cannot measure, such as the shadow portions of the object to be measured, the portion of narrow and deep channel, etc., whereby each fragment of the object to be measured-thus cut can be measured without a dead angle.

Further, the entire object to be measured consisting of the fragments can also be measured while keeping a relative positional relation between the fragments of the object to be measured in the same state as before cut. This enables to obtain the relative positional relation between the cut fragments. Synthesizing resultant measurement data by a computer, all-inclusive data of the shape of an object to be measured (which is measurement data of the entire object to be measured before cut) can be obtained.

The object to be measured holding means (hereinafter, sometimes referred to as holding means) according to the present invention is detachably mounted on the Y stage 4

(FIG. 1), but a relative positional relation between the Y stage 4 and the holding means as mounted thereon is always kept constant through coupling between the Y stage 4 and the holding means by the fitting portion (for example, positioning pins) 6 (FIG. 1). Namely, after the holding means is once removed from the Y stage 4 and when it is again mounted on the Y stage 4, the relative positional relation can be kept constant.

Each fragment of the cut, object to be measured is freely mounted on or dismounted from the holding means, but the relative positional relation between the holding means and each fragment when mounted thereon is always kept constant. Namely, after the each fragment is once removed from the holding means and when it is again mounted on the holding means, the relative positional relation between them can be kept constant, because the each fragment is positioned on the holding means by fitting between the each fragment and the holding means (for example, by fitting between a plurality of projecting members provided on the bottom of the object to be measured and corresponding recesses provided in the holding means, and by fitting between a plurality of recesses provided on the bottom surface of the fragment and corresponding projections provided on the holding means).

Further, relative positional relations between the fragments are similarly the same as those between them in an integral state before cut.

The principle of measurement of three-dimensional shape is next described referring to FIG. 1 and FIGS. 2A to 2C.

There are three types of measurements in the measurement according to the present invention. First described is a concentric measurement.

As shown in FIG. 2A, only one fragment (first fragment) of the cut, object to be measured is set so that the center thereof is located near the rotational axis of the rotation stage. Then the R stage is moved so that the optical axis of the laser displacement gage (LU) comes to coinoide with the rotational axis of the rotation stage.

In this state, a distance is measured between the first fragment and the laser displacement gage (LU). Then the R stage is moved by a predetermined amount (fine amount) in the radial direction of concentric circles and thereafter a distance is measured between the first fragment and the laser displacement gage (LU) while rotating the rotation stage. After completion of the measurement along a circle, the R stage is further moved by a predetermined amount (fine amount) and the same measurement is carried out. Similarly moving the R stage, the measurement is continued before the optical axis of the laser displacement gage (LU) hits no part of the first fragment with a revolution thereof, and then the measurement is finished.

Next described is a cylindrical measurement. As shown in FIG. 2B, the first fragment is set so that the center thereof comes to be located near the rotational axis of the rotation stage. The optical axis of the other laser displacement gage (LS) is set at a position of the lower limit of measurement of the first fragment. While rotating the first fragment around, a distance is measured between the first fragment and the laser displacement gage (LS). Then the Z stage is moved by a predetermined amount upward in parallel with the rotational axis and the same measurement is carried out. The measurement is continued before the optical axis of the laser displacement gage (LS) hits no part of the first fragment rotating, and then the measurement is finished.

At this stage, data of three-dimensional shape of the first fragment has been obtained by the measurement from the top and the measurement from the side.

Further, the same measurements are carried out for the remaining fragments to obtain three-dimensional shape data thereof.

After completion of all these measurements, a grid measurement is carried out for the object to be measured consisting of the fragments. This is a measurement of the shape of the top surface of the object to be measured consisting of the fragments. In more detail, as shown in FIG. 2C, the fragments are simultaneously set in the corresponding fitting portions in the holding means, and a distance is measured between the object to be measured and the laser displacement gage (LU) by the laser displacement gage (LU) irradiating the object to be measured from the top, while moving the X stage 3 and the Y stage 4.

The thus obtained data by the concentric measurement and cylindrical measurement of the respective fragments is combined with the data by the grid measurement of the object to be measured consisting of the fragments, whereby all-inclusive information of the shape of the object to be measured can be obtained.

In the measurement method of the present invention, the portions of the object to be measured, which the conventional apparatus or methods cannot measure, such as the shadow portions of the object to be measured, the portions of narrow and deep channels, etc. are cut so that the laser beam can reach there, and each fragment of the object to be measured thus cut is measured without a dead angle. Further, the object to be measured consisting of the fragments is also measured while keeping the relative positional relations between the fragments of the object to be measured same as those before cut, whereby the relative positional relations can be known between the fragments of the object to be measured thus cut and all-inclusive data of the shape of the object to be measured (measurement data of the entire object to be measured before cut) can be obtained by combining the both data with each other on a computer.

The above and other objects, features and advantages of the present invention are explained hereinafter and may be better understood by reference to the drawings and the descriptive matter which follows.

DETAILED DESCRIPTION OF THE PREFERRED EMBODIMENTS

Figure 1:
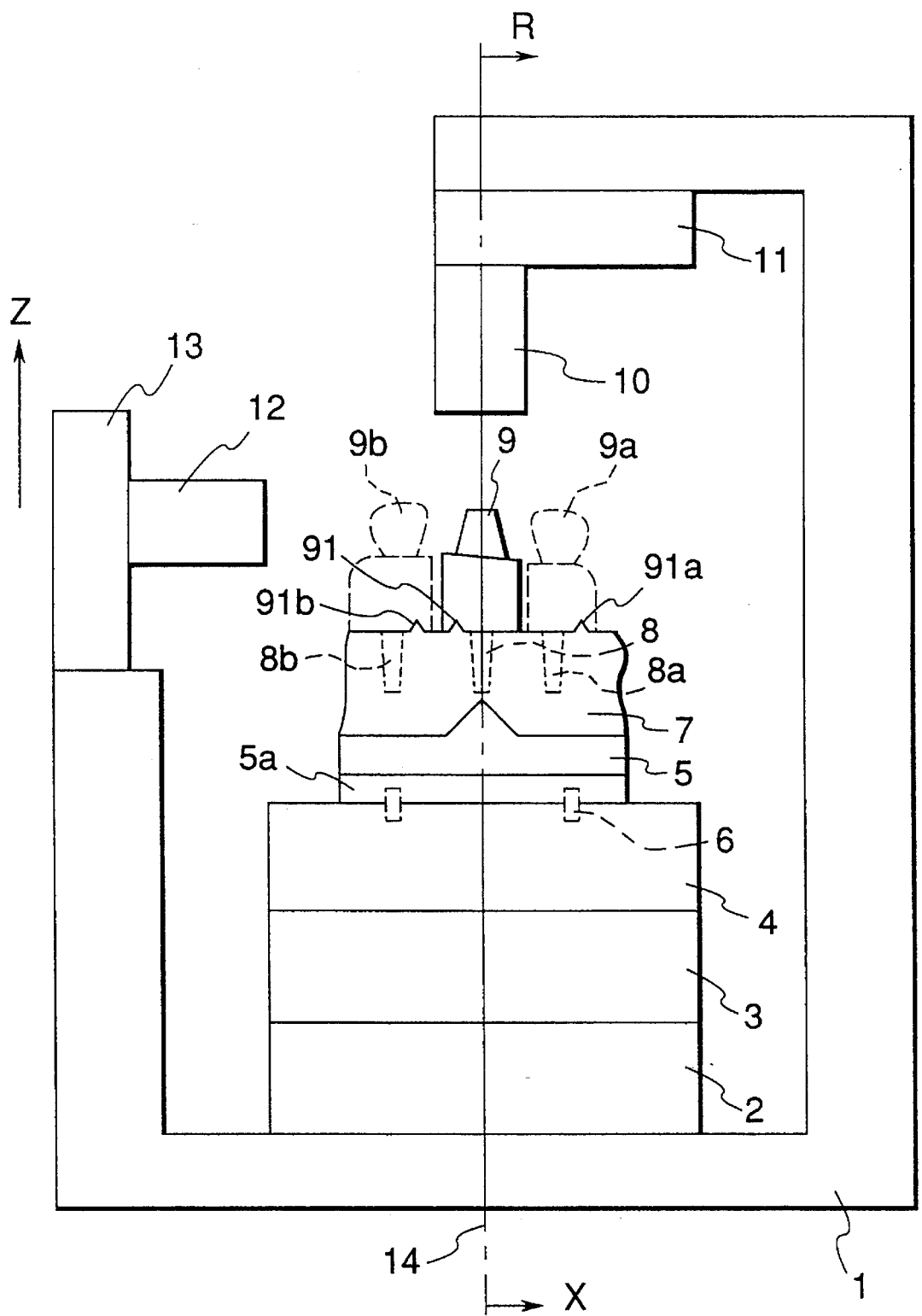
FIG. 1 is a schematic side view to show a three-dimensional measuring apparatus of an embodiment.
Figure 2A:
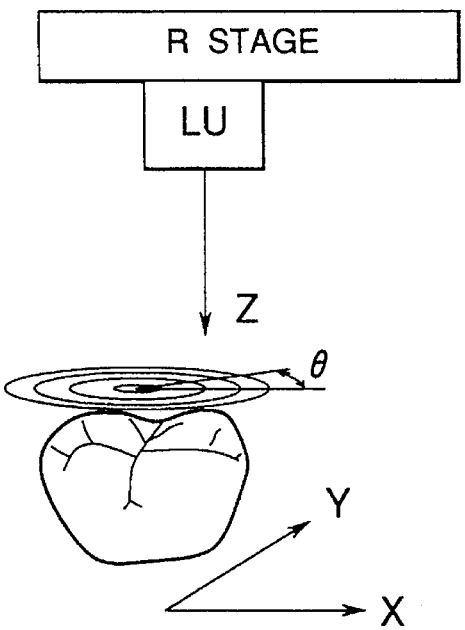
FIGS. 2A to 2C are explanatory drawings (perspective views) to show the principles of measurements according to the present invention.
Figure 2B:
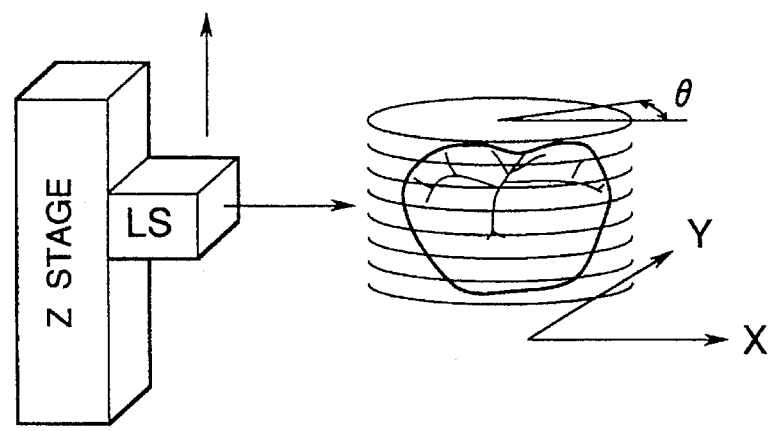
Figure 2C:
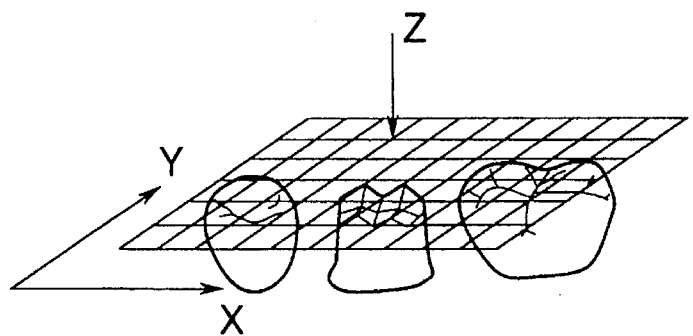

Referring to FIG. 1, an embodiment of the three-dimensional shape measuring apparatus and the three-dimensional shape measuring method according to the present invention will be described. In the present embodiment the object to be measured is a tooth model used in producing a crown in dentistry, but the object to be measured may be any other object.

The three-dimensional shape measuring apparatus has a body base 1, on which a rotation stage 2 is mounted. Set on the rotation stage 2 is an XY stage movable in a horizontal direction, independently of rotation of the rotation stage 2. The XY stage is composed of an X stage S movable in a predetermined horizontal direction X and a Y stage 4 movable in a horizontal direction Y perpendicular to the horizontal direction X, on the top surface of which positioning pins 6 stand. These rotation stage 2, X stage 3, and Y stage 4 are driven and controlled independently of each other by unrepresented respective stepping motors and control apparatus.

A cast base plate 5a and a cast base 5 incorporated therewith are detachably mounted on the Y stage 4 in a fitting state with the positioning pins 6. Further, a gypsum block 7 is set on the cast base 5. The gypsum block 7 has a plurality of recesses and projections. The recesses are arranged to be coupled with dowel pins 8, 8a, and 8b planted in bottom surfaces of an abutment tooth model 9 and proximal tooth models 9a and 9b integrally formed as an object to be measured. The projections are arranged to be coupled with grooves 91, 91a, and 91b formed on the bottom surfaces of the models 9, 9a, and 9b of the object to be measured.

An R stage 11 is provided above the gypsum block 7. This R stage is movable in the horizontal direction and in the direction of the diameter R of the rotation stage 2. There is a first laser displacement gage 10 provided on the lower surface of the R stage 11 so that the optical axis thereof becomes in parallel with the rotational axis 14 of the rotation stage 2.

A Z stage 13 is provided beside the gypsum block 7. This Z stage is movable in the Z direction parallel to the rotational axis 14. A second laser displacement gage 12 is provided on a side surface of the Z stage 13 so that the optical axis thereof becomes perpendicular to the rotational axis 14.

Here, the cast base plate 5a incorporated with the cast base 5 is detachably mounted on the Y stage 4, and the relative positional relation between the Y stage 4 and the cast base plate 5a mounted thereon is always kept constant by the positioning pins 6. Namely, after the cast base plate 5a is once removed from the Y stage and when the cast base plate 5a is again set on the Y stage 4, the relative positional relation is kept constant.

The abutment tooth model 9 and proximal tooth models 9a and 9b integrally formed are removed from the gypsum block 7 and cut into fragmental models. When the fragmental models are mounted on corresponding fitting portions of the gypsum block separately from each other, the relative positional relations between the fragmental models are the same as those in the integral state before cut.

Next described is a method for producing the gypsum block 7 (which is normally produced by a dental mechanic).

First, a necessary portion in a tooth form model, i.e. a portion of the abutment tooth model 9 on which a crown is to be mounted, and its proximal tooth models 9a, 9b, is cut out of the tooth form model. Then dowel pins 8, 8a, and 8b are planted on the bottoms of the respective models. In this state, the abutment tooth cast 9 and the proximal tooth models 9a and 9b are integral.

After that, a groove 91 is cut in each bottom of the abutment tooth model 9 and the proximal tooth models 9a and 9b, and then a release agent is applied all around the bottom surfaces and the dowel pins. After the preparation up to this step is completed, gypsum is raised on the cast base 5 incorporated with the cast base plate 5a, and the abutment tooth model 9 and the proximal tooth models 9a and 9b integrally formed are put thereon. A dowel pin 8 is planted in the bottom portion of each model, which is coated with the release agent.

After a while, the gypsum hardens. Since contact surfaces between the gypsum and, the abutment tooth model 9 and the proximal tooth models 9a and 9b are preliminarily coated with the release agent, the abutment tooth model 9 and the proximal tooth models 9a and 9b can be readily removed from the hardened gypsum block 7. At this stage, the integrally formed model is cut by a fret saw to be separated into the abutment tooth model 9 and the proximal tooth models 9a and 9b shown in FIG. 1.

The abutment tooth model 9 and the proximal tooth models 9a and 9b thus separated each are freely mounted on or dismounted from the gypsum block 7. The dowel pins 8, 8a, and 8b and the grooves 91, 91a, and 91b always keep constant the relative positional relations between the respective models 9, 9a, and 9b when mounted and the gypsum block 7. Namely, after each model is once removed from the gypsum block 7 and when it is again mounted on the gypsum block 7, the relative positional relation between them is kept constant, because each model is positioned on the gypsum block 7 by the fitting between the dowel pin 8, 8a, and 8b provided on the bottom surface of the each model and the corresponding recess provided in the gypsum block, and by fitting between the groove 91, 91a, and 91b provided on the bottom surface of the each model and the corresponding projection provided on the gypsum block.

Further, the relative positional relations between the models are similarly the same as those between them in the integrally formed state before cut.

The three-dimensional shape measuring method is described below.

Only the abutment tooth model (object to be measured) 9 after cut is mounted on the corresponding fitting portion on the gypsum block 7. Then, moving the X stage 3 and Y stage 4, the center of the object to be measured 9 is adjusted to be located near the rotational axis 14 of the rotation stage 2. Then the R stage 11 is moved so that the optical axis of the first laser displacement gage 10 comes to coincide with the rotational axis 14 of the rotation stage 2.

Moving the R stage 11 in the radial direction of concentric circles in this state, the concentric measurement in the above description of the principle is carried out with the first laser displacement gage 10. After completion of this measurement, the cylindrical measurement in the above description of the principle is carried out with the second laser displacement gage 12, moving the Z stage 13 in the vertical direction. At this stage, sufficient shape information is obtained as to the abutment tooth model 9 by the measurement from the top and the measurement from the side.

Further, information on the shapes of the two proximal teeth adjacent to the abutment tooth is also necessary to produce a crown. Thus, removing the abutment tooth model 9 from the gypsum block 7, the proximal tooth model 9a is set in place thereof on the corresponding fitting portion on the gypsum block 7. Then, similarly as in the measurements of the abutment tooth model 9, the concentric measurement and cylindrical measurement are carried out for the proximal tooth model 9a.

After that, the same measurements are carried out for the other proximal tooth model 9b. As described, the measurements are completed for each of the abutment tooth model 9 and the proximal tooth models 9a and 9b. Further, the same measurements are carried out for three pairing teeth to these teeth.

After completion of all measurements for the models, the grid measurement is carried out. Namely, the abutment tooth model 9 and the proximal tooth models 9a and 9b are simultaneously set on the corresponding fitting portions on the gypsum block 7 and the grid measurement in the above description of the principle is carried out with the first laser displacement gage 10, while moving the X stage 3 and Y stage 4.

The same measurement is conducted for the pairing teeth, and then all measurements are finished.

Combining the thus obtained data of the concentric measurement, cylindrical measurement, and grid measurement with each other by a computer, all-inclusive data of the shape of the object to be measured can be attained.

Although the above embodiment employed the tooth model as an object to be measured, the same measurements can be applied to other object to be measured.

Therefore, it is intended that the invention not be limited to the preferred embodiments described herein, but that the invention will include all embodiments falling within the scope of the appended claims.

What is claimed is:

1. An apparatus for measuring a three-dimensional shape of an object to be measured provided with a fitting portion, comprising:

a body base;

a rotation stage set on said base;

an XY stage set on said rotation stage and provided with a fitting portion, said XY stage being movable in a predetermined horizontal direction and in a horizontal direction perpendicular thereto independently of rotation of said rotation stage;

drive control means for independently driving and controlling said rotation stage and XY stage;

holding means for holding said object to be measured, said holding means being provided with a fit portion to fit with said fitting portion of said XY stage, and a fit portion to fit with said fitting portion of said object to be measured;

an R stage set above said holding means, said R stage being movable in a horizontal direction and in a direction of the diameter of said rotation stage;

a first optical displacement gage provided on a lower surface of said R stage so that an optical axis thereof becomes parallel to a rotational axis of said rotation stage;

a Z stage provided beside said holding means, said Z stage being movable in a direction parallel to said rotational axis; and a second optical displacement gage provided on a side surface of said Z stage so that an optical axis thereof becomes perpendicular to the rotational axis of said rotation stage.

2. An apparatus according to claim 1, wherein said optical displacement gage is a laser displacement gage.

3. An apparatus according to claim 1, wherein said object to be measured is a tooth model.

4. An apparatus for measuring a three-dimensional shape of an object to be measured provided with a plurality of recesses on a surface thereof, comprising:

a body base;

a rotation stage set on said base;

an XY stage set on said rotation stage, said XY stage being movable in a predetermined horizontal direction and a horizontal direction perpendicular thereto independently of rotation of said rotation stage, said XY stage being provided with a positioning pin on an upper surface thereof;

drive control means for independently driving and controlling said rotation stage and XY stage;

holding means for holding said object to be measured, said holding means comprising a cast base plate detachably mounted on said XY stage in a fitting state with said positioning pin, a cast base set on said cast base plate, and a gypsum block set on said cast base and provided with a plurality of projections to fit with said recesses of said object to be measured;

an R stage set above said holding means, said R stage being movable in a horizontal direction and in a direction of the diameter of said rotation stage;

a first laser displacement gage provided on a lower surface of said R stage so that an optical axis thereof becomes parallel to a rotational axis of said rotation stage;

a Z stage provided beside said holding means, said Z stage being movable in a direction parallel to said rotational axis; and a second laser displacement gage provided on a side surface of said Z stage so that an optical axis thereof becomes perpendicular to the rotational axis of said rotation stage.

5. An apparatus according to claim 4, wherein said object to be measured is a tooth model.

* * * * *